US010735465B2

(12) United States Patent
Chen et al.

(10) Patent No.: US 10,735,465 B2
(45) Date of Patent: *Aug. 4, 2020

(54) SECURING AN ENDPOINT IN A COMPUTER NETWORK

(71) Applicant: International Business Machines Corporation, Armonk, NY (US)

(72) Inventors: Kuo-Chun Chen, New Taipei (TW); Wei-Hsiang Hsiung, Taipei (TW); Sheng-Tung Hsu, Taipei (TW); Fadly Yahaya, Taipei (TW)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/457,940

(22) Filed: Jun. 29, 2019

(65) Prior Publication Data

US 2019/0327266 A1 Oct. 24, 2019

Related U.S. Application Data

(63) Continuation of application No. 15/874,915, filed on Jan. 19, 2018.

(51) Int. Cl.
*H04L 29/06* (2006.01)
*G06F 21/60* (2013.01)
(Continued)

(52) U.S. Cl.
CPC ........ *H04L 63/1475* (2013.01); *G06F 21/604* (2013.01); *H04L 9/0819* (2013.01);
(Continued)

(58) Field of Classification Search
CPC ... H04L 63/1475; H04L 9/0819; H04L 9/302; H04L 63/0209; H04L 63/20;
(Continued)

(56) References Cited

U.S. PATENT DOCUMENTS 9,069,950 B2 6/2015 Austin
9,300,686 B2 * 3/2016 Pidathala .............. H04L 63/145
(Continued)

OTHER PUBLICATIONS

Visualization and Switching Mechanisims for Security Zones Peter Riedl, Philip Koller, Rene Mayrhofer, Andreas Moller, Marion Koelle, Mathias Kranz MoMM '13: Proceedings of International Conference on Advances in Mobile Computing & Multimedia . Dec. 2013, pp. 278-281 . (Year: 2013).*

*Primary Examiner* — Kambiz Zand
*Assistant Examiner* — Mohammad S Shams
(74) *Attorney, Agent, or Firm* — Jeffrey S. LaBaw; David H. Judson (57) ABSTRACT

A computer network endpoint is secured to prevent information leak or other compromise by instantiating in memory first, second and third security zones. With respect to an authorized user, the first zone is readable and writable, the second zone is read-only, and the third zone is neither readable nor writable. System information (e.g., applications, libraries, policies, etc.) are deployed into the first zone from the second zone. When sensitive data is generated in the first zone, e.g., when a secure communication session is established using a cryptographic key, the sensitive data is transferred from the first zone to the third zone, wherein it is immune from information leak or other compromise. The sensitive information is transferable from the third zone to one or more external having a need to know that information. Because information does not pass directly from the first security zone to the external systems, the endpoint is secured against information leak or other attack.

7 Claims, 3 Drawing Sheets

(51) Int. Cl.
  *H04L 9/08*   (2006.01)
  *H04L 9/30*   (2006.01)
  *G06F 8/65*   (2018.01)
  *G06F 9/455*  (2018.01)

(52) U.S. Cl.
  CPC ............ *H04L 9/0897* (2013.01); *H04L 9/302* (2013.01); *H04L 63/0209* (2013.01); *H04L 63/20* (2013.01); *G06F 8/65* (2013.01); *G06F 9/45558* (2013.01); *G06F 2009/45562* (2013.01); *G06F 2009/45595* (2013.01)

(58) Field of Classification Search
  CPC ...... G06F 21/604; G06F 8/65; G06F 9/45558; G06F 2009/45562; G06F 2009/45595
  USPC .......................................................... 380/24
  See application file for complete search history.

(56) References Cited

U.S. PATENT DOCUMENTS

| | | |
|---|---|---|
| 9,571,512 B2 | 2/2017 | Ray et al. |
| 2004/0025044 A1* | 2/2004 | Day ................... H04L 63/1408 726/23 |
| 2005/0131955 A1* | 6/2005 | Borthakur ........... G06F 16/1734 |
| 2008/0228770 A1* | 9/2008 | Halcrow ................ G06F 16/119 |
| 2011/0213971 A1* | 9/2011 | Gurel ..................... G06F 21/10 713/165 |
| 2012/0066759 A1 | 3/2012 | Chen et al. |
| 2013/0019277 A1* | 1/2013 | Chang ................. H04L 63/0218 726/1 |
| 2016/0014159 A1* | 1/2016 | Schrecker .......... H04L 63/0869 726/1 |
| 2016/0044058 A1* | 2/2016 | Schlauder .......... H04L 63/1433 726/25 |
| 2016/0323264 A1* | 11/2016 | Nayshtut ............... H04L 9/3268 |
| 2016/0359859 A1* | 12/2016 | Capone ............... G06F 21/6218 |
| 2017/0180318 A1 | 6/2017 | Lutas et al. |
| 2017/0187719 A1 | 6/2017 | Margel et al. |
| 2017/0201537 A1* | 7/2017 | Caldwell ............... H04J 3/0667 |
| 2017/0235966 A1* | 8/2017 | Ray .................... G06F 21/6218 713/165 |
| 2019/0213325 A1* | 7/2019 | McKerchar ............. G06F 21/56 |
| 2019/0245894 A1* | 8/2019 | Epple ..................... G06F 21/56 |
| 2019/0280865 A1* | 9/2019 | Tobias .................... H04L 9/006 |
| 2019/0289653 A1* | 9/2019 | Sarkar .................. H04W 12/08 |

* cited by examiner

SECURING AN ENDPOINT IN A COMPUTER NETWORK

BACKGROUND OF THE INVENTION

Technical Field

This disclosure relates generally to information security on network-connected appliances.

Background of the Related Art

Security threats are continually evolving. With the rapid growth of cutting-edge web applications and increased file sharing, activities that may have been considered harmless in the past could become potential openings for attackers. Traditional security means, such as anti-malware software and firewalls, have become easier to bypass. Thus, there is a significant need for more advanced, proactive threat protection that can help provide comprehensive security against new and emerging threats. Such techniques are known as Advanced Persistent Threat (APT) protection.

While such techniques can provide significant advantages, the use of Secure Sockets Layer (SSL) and/or Transport Layer Security (TLS)-based encryption for network communications generally inhibits the ability (of systems that provide network forensics) to identify and mitigate threat traffic from within the network. It is now estimated that upwards of two-thirds or more of all business network traffic is conveyed over SSL/TLS. This means that organizations relying on network communications typically are unable to protect (from the network) the endpoints in their enterprise that may be susceptible to such threats. Indeed, the vast majority of SSL/TLS communications use only server authentication, i.e., the server is authenticated via the SSL/TLS protocols to the client, but the client is unauthenticated with respect to the server. This authentication asymmetry provides the opportunity for a process to interpose itself between client and server in such a way as to enable decryption of communications and inspection of its contents. Such a "man-in-the-middle" (MITM) process may be malicious, or it may be used for legitimate reasons, such as packet inspection (for threat detection).

Thus, when network forensics systems gather data packets that comprise encrypted traffic, they are unable to perform further investigations on that traffic because, if malicious, the captured packets cannot be decrypted. With current network security technology, the network forensics system relies on having the server private key, or use of an SSL proxy or other MITM technology to attempt to monitor decrypted traffic. These known solutions, however, have limitations in use. Thus, for example, MITM only works well with clients (mainly browsers) that allow end users to inject certificates, and many connections are based on proprietary clients that restrict this capability.

More generally, the endpoint system as typically managed by enterprise is often compromised with respect to either useability or security. When the endpoint is too tightly controlled, end users do not have root access to their system and thus cannot readily configure it without administrator permission. Without such permission, end users cannot install software or customize the endpoint to suit their needs, thereby degrading end user productivity from these machines. On the other hand, with too little system oversight, end users, as well as attackers, may be able to interfere with or otherwise break enterprise endpoint policy enforcement, or to leak valuable enterprise information from the machine.

There remains a need to enhance an endpoint system to address these often conflicting requirements of useability and security. A further requirement is to provide enhanced security techniques that enable enterprise systems to be able to identify and use cryptographic information (e.g., master keys) associated with user sessions established by the host, e.g., to facilitate network forensics and other security-related activities.

BRIEF SUMMARY

An endpoint (such as a personal computer, laptop, server or other machine) in an enterprise computer network includes a mechanism that secures the endpoint from information leak or other compromise while at the same time ensuring that the authorized user of the machine is not encumbered in his or her permitted use. To this end, the endpoint is configured, typically by an associated endpoint management system, to instantiate a set of security zones in the endpoint. In one embodiment, the set of security zones comprises first, second and third security zones, wherein, with respect to the authorized user of the endpoint, the first security zone is readable and writable, the second security zone is read-only, and the third security zone is neither readable nor writable. The first security zone is a user sub-system for which the user in effect has root access and over which the user can exercise control. The second and third security zones together comprise a secure sub-system that is not exposed to the user, and that is not reachable by the user directly.

In operation, the endpoint management system (or other permitted systems or entities) deploy given first information into the secure sub-system (and, in particular, the second security zone), and this first information is then available to be selectively loaded from the second security zone into the user sub-system (the first security zone) as needed. The first information comprises, for example, an application configured to execute in the endpoint, a library configured to execute in association with the application, and a policy that is configured to be enforced on the endpoint. Further, when sensitive data is generated in the first security zone, e.g., when a secure communication session is established using a cryptographic key, at least some of the sensitive data is transferred from the first security zone to the third security zone, wherein it is immune from information leak or other compromise. The sensitive information is then securely transferred from the third security zone to one or more external systems, such as the endpoint management system, having a need to know that information, e.g., to facilitate a further forensic analysis. Because information does not pass directly from the first security zone to the external systems, the endpoint configured in this manner is secured against information leak or other attack.

The foregoing has outlined some of the more pertinent features of the disclosed subject matter. These features should be construed to be merely illustrative. Many other beneficial results can be attained by applying the disclosed subject matter in a different manner or by modifying the subject matter as will be described.

BRIEF DESCRIPTION OF THE DRAWINGS

For a more complete understanding of the subject matter and the advantages thereof, reference is now made to the following descriptions taken in conjunction with the accompanying drawings, in which.

DETAILED DESCRIPTION OF AN ILLUSTRATIVE EMBODIMENT

Figure 1:
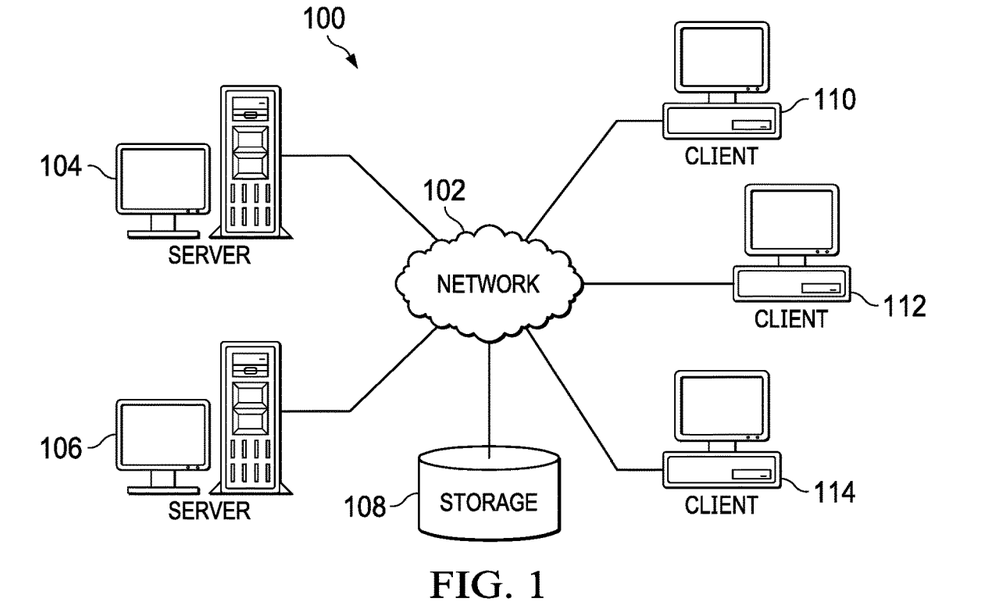
FIG. 1 depicts an exemplary block diagram of a distributed data processing environment in which exemplary aspects of the illustrative embodiments may be implemented.
Figure 2:
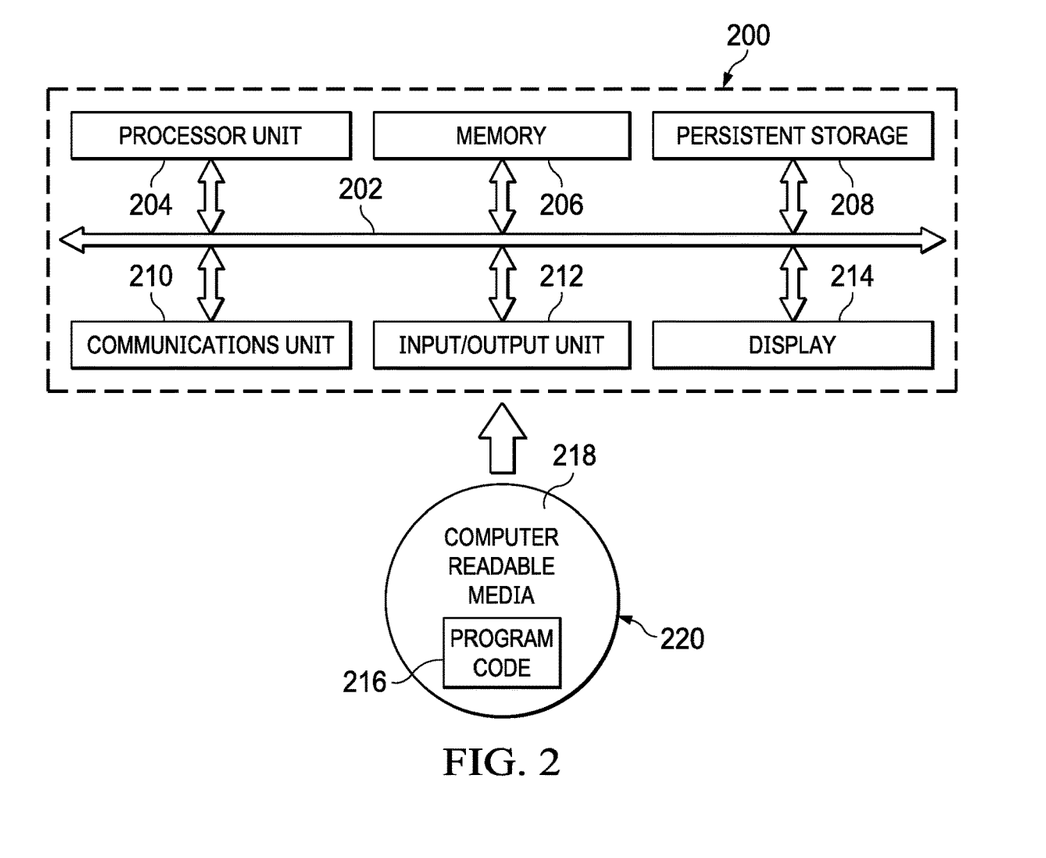
FIG. 2 is an exemplary block diagram of a data processing system in which exemplary aspects of the illustrative embodiments may be implemented.

With reference now to the drawings and in particular with reference to FIGS. 1-2, exemplary diagrams of data processing environments are provided in which illustrative embodiments of the disclosure may be implemented. It should be appreciated that FIGS. 1-2 are only exemplary and are not intended to assert or imply any limitation with regard to the environments in which aspects or embodiments of the disclosed subject matter may be implemented. Many modifications to the depicted environments may be made without departing from the spirit and scope of the present invention.
Client-Server Technologies With reference now to the drawings, FIG. 1 depicts a pictorial representation of an exemplary distributed data processing system in which aspects of the illustrative embodiments may be implemented. Distributed data processing system 100 may include a network of computers in which aspects of the illustrative embodiments may be implemented. The distributed data processing system 100 contains at least one network 102, which is the medium used to provide communication links between various devices and computers connected together within distributed data processing system 100. The network 102 may include connections, such as wire, wireless communication links, or fiber optic cables.

In the depicted example, server 104 and server 106 are connected to network 102 along with storage unit 108. In addition, clients 110, 112, and 114 are also connected to network 102. These clients 110, 112, and 114 may be, for example, personal computers, network computers, or the like. In the depicted example, server 104 provides data, such as boot files, operating system images, and applications to the clients 110, 112, and 114. Clients 110, 112, and 114 are clients to server 104 in the depicted example. Distributed data processing system 100 may include additional servers, clients, and other devices not shown.

In the depicted example, distributed data processing system 100 is the Internet with network 102 representing a worldwide collection of networks and gateways that use the Transmission Control Protocol/Internet Protocol (TCP/IP) suite of protocols to communicate with one another. At the heart of the Internet is a backbone of high-speed data communication lines between major nodes or host computers, consisting of thousands of commercial, governmental, educational and other computer systems that route data and messages. Of course, the distributed data processing system 100 may also be implemented to include a number of different types of networks, such as for example, an intranet, a local area network (LAN), a wide area network (WAN), or the like. As stated above, FIG. 1 is intended as an example, not as an architectural limitation for different embodiments of the disclosed subject matter, and therefore, the particular elements shown in FIG. 1 should not be considered limiting with regard to the environments in which the illustrative embodiments of the present invention may be implemented.

With reference now to FIG. 2, a block diagram of an exemplary data processing system is shown in which aspects of the illustrative embodiments may be implemented. Data processing system 200 is an example of a computer, such as client 110 in FIG. 1, in which computer usable code or instructions implementing the processes for illustrative embodiments of the disclosure may be located.

With reference now to FIG. 2, a block diagram of a data processing system is shown in which illustrative embodiments may be implemented. Data processing system 200 is an example of a computer, such as server 104 or client 110 in FIG. 1, in which computer-usable program code or instructions implementing the processes may be located for the illustrative embodiments. In this illustrative example, data processing system 200 includes communications fabric 202, which provides communications between processor unit 204, memory 206, persistent storage 208, communications unit 210, input/output (I/O) unit 212, and display 214.

Processor unit 204 serves to execute instructions for software that may be loaded into memory 206. Processor unit 204 may be a set of one or more processors or may be a multi-processor core, depending on the particular implementation. Further, processor unit 204 may be implemented using one or more heterogeneous processor systems in which a main processor is present with secondary processors on a single chip. As another illustrative example, processor unit 204 may be a symmetric multi-processor (SMP) system containing multiple processors of the same type.

Memory 206 and persistent storage 208 are examples of storage devices. A storage device is any piece of hardware that is capable of storing information either on a temporary basis and/or a permanent basis. Memory 206, in these examples, may be, for example, a random access memory or any other suitable volatile or non-volatile storage device. Persistent storage 208 may take various forms depending on the particular implementation. For example, persistent storage 208 may contain one or more components or devices. For example, persistent storage 208 may be a hard drive, a flash memory, a rewritable optical disk, a rewritable magnetic tape, or some combination of the above. The media used by persistent storage 208 also may be removable. For example, a removable hard drive may be used for persistent storage 208.

Communications unit 210, in these examples, provides for communications with other data processing systems or devices. In these examples, communications unit 210 is a network interface card. Communications unit 210 may provide communications through the use of either or both physical and wireless communications links.

Input/output unit 212 allows for input and output of data with other devices that may be connected to data processing system 200. For example, input/output unit 212 may provide a connection for user input through a keyboard and mouse. Further, input/output unit 212 may send output to a printer. Display 214 provides a mechanism to display information to a user.

Instructions for the operating system and applications or programs are located on persistent storage 208. These instructions may be loaded into memory 206 for execution by processor unit 204. The processes of the different embodiments may be performed by processor unit 204 using computer implemented instructions, which may be located in a memory, such as memory 206. These instructions are referred to as program code, computer-usable program code, or computer-readable program code that may be read and executed by a processor in processor unit 204. The program code in the different embodiments may be embodied on different physical or tangible computer-readable media, such as memory 206 or persistent storage 208.

Program code 216 is located in a functional form on computer-readable media 218 that is selectively removable and may be loaded onto or transferred to data processing system 200 for execution by processor unit 204. Program code 216 and computer-readable media 218 form computer program product 220 in these examples. In one example, computer-readable media 218 may be in a tangible form, such as, for example, an optical or magnetic disc that is inserted or placed into a drive or other device that is part of persistent storage 208 for transfer onto a storage device, such as a hard drive that is part of persistent storage 208. In a tangible form, computer-readable media 218 also may take the form of a persistent storage, such as a hard drive, a thumb drive, or a flash memory that is connected to data processing system 200. The tangible form of computer-readable media 218 is also referred to as computer-recordable storage media. In some instances, computer-recordable media 218 may not be removable.

Alternatively, program code 216 may be transferred to data processing system 200 from computer-readable media 218 through a communications link to communications unit 210 and/or through a connection to input/output unit 212. The communications link and/or the connection may be physical or wireless in the illustrative examples. The computer-readable media also may take the form of non-tangible media, such as communications links or wireless transmissions containing the program code. The different components illustrated for data processing system 200 are not meant to provide architectural limitations to the manner in which different embodiments may be implemented. The different illustrative embodiments may be implemented in a data processing system including components in addition to or in place of those illustrated for data processing system 200. Other components shown in FIG. 2 can be varied from the illustrative examples shown. As one example, a storage device in data processing system 200 is any hardware apparatus that may store data. Memory 206, persistent storage 208, and computer-readable media 218 are examples of storage devices in a tangible form.

In another example, a bus system may be used to implement communications fabric 202 and may be comprised of one or more buses, such as a system bus or an input/output bus. Of course, the bus system may be implemented using any suitable type of architecture that provides for a transfer of data between different components or devices attached to the bus system. Additionally, a communications unit may include one or more devices used to transmit and receive data, such as a modem or a network adapter. Further, a memory may be, for example, memory 206 or a cache such as found in an interface and memory controller hub that may be present in communications fabric 202.

Computer program code for carrying out operations of the present invention may be written in any combination of one or more programming languages, including an object-oriented programming language such as Java™, Smalltalk, C++, C#, Objective-C, or the like, and conventional procedural programming languages. The program code may execute entirely on the user's computer, partly on the user's computer, as a stand-alone software package, partly on the user's computer and partly on a remote computer, or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Those of ordinary skill in the art will appreciate that the hardware in FIGS. 1-2 may vary depending on the implementation. Other internal hardware or peripheral devices, such as flash memory, equivalent non-volatile memory, or optical disk drives and the like, may be used in addition to or in place of the hardware depicted in FIGS. 1-2. Also, the processes of the illustrative embodiments may be applied to a multiprocessor data processing system, other than the SMP system mentioned previously, without departing from the spirit and scope of the disclosed subject matter.

As will be seen, the techniques described herein may operate in conjunction within the standard client-server paradigm such as illustrated in FIG. 1 in which client machines communicate with an Internet-accessible Web-based portal executing on a set of one or more machines. End users operate Internet-connectable devices (e.g., desktop computers, notebook computers, Internet-enabled mobile devices, or the like) that are capable of accessing and interacting with the portal. Typically, each client or server machine is a data processing system such as illustrated in FIG. 2 comprising hardware and software, and these entities communicate with one another over a network, such as the Internet, an intranet, an extranet, a private network, or any other communications medium or link. A data processing system typically includes one or more processors, an operating system, one or more applications, and one or more utilities. The applications on the data processing system provide native support for Web services including, without limitation, support for HTTP, SOAP, XML, WSDL, UDDI, and WSFL, among others. Information regarding SOAP, WSDL, UDDI and WSFL is available from the World Wide Web Consortium (W3C), which is responsible for developing and maintaining these standards; further information regarding HTTP and XML is available from Internet Engineering Task Force (IETF). Familiarity with these standards is presumed.

Incident Forensics Analysis of SSL Traffic Flows

Figure 3:
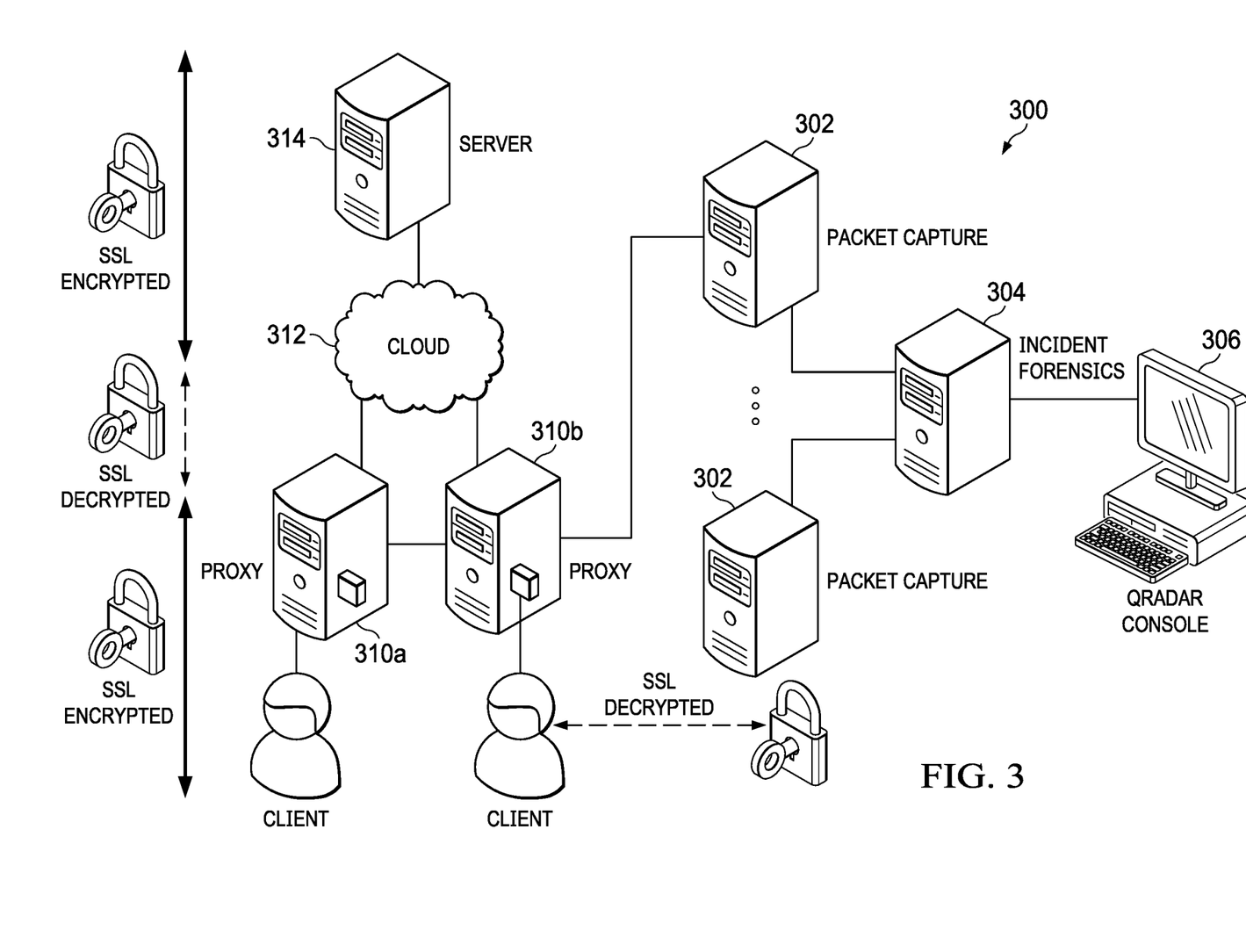
FIG. 3 illustrates a known SSL inspection solution in which the techniques of this disclosure may be implemented.

As further background, it is known in the prior art to implement security intelligence platform technologies to provide search-driven data exploration, session reconstruction, and forensics intelligence to assist security incident investigations. FIG. 3 depicts one use case of technologies of this type, namely, SSL/TLS traffic inspection. In pertinent part, the security intelligence platform 300 comprises a set of packet capture appliances 302, an incident forensics module appliance 304, and a security intelligence console 306. The packet capture and module appliances are configured as network appliances, or they may be configured as virtual appliances. The packet capture appliances 302 are operative to capture packets off the network (using known packet capture (pcap) application programming interfaces (APIs) or other known techniques), and to provide such data (e.g., real-time log event and network flow) to a database (not shown), where the data is stored and available for analysis by the forensics module 304 and the security intelligence console 306. A packet capture appliance operates in a session-oriented manner, capturing all packets in a flow, and indexing metadata and payloads to enable fast search-driven data exploration. The database provides a forensics repository, which distributed and heterogeneous data sets comprising the information collected by the packet capture appliances. The console 306 provides a web- or cloud-accessible user interface (UI) that exposes a "Forensics" dashboard tab to facilitate an incident investigation workflow by an investigator. Using the dashboard, an investigator selects a security incident. The incident forensics module 304 retrieves all the packets (including metadata, payloads, etc.) for a selected security incident and reconstructs the session for analysis.

A representative commercial product that implements an incident investigation workflow of this type is IBM® Security QRadar® Incident Forensics V7.2.3 (or higher). Using this platform, an investigator searches across the distributed and heterogeneous data sets stored in the database, and receives a unified search results list. The search results may be merged in a grid, and they can be visualized in a "digital impression" tool so that the user can explore relationships between identities.

In particular, a typical incident forensics investigation to extract relevant data from network traffic and documents in the forensic repository is now described. According to this approach, the platform enables a simple, high-level approach of searching and bookmarking many records at first, and then enables the investigator to focus on the bookmarked records to identify a final set of records. In a typical workflow, an investigator determines which material is relevant. He or she then uses that material to prove a hypothesis or "case" to develop new leads that can be followed up by using other methods in an existing case. Typically, the investigator focuses his or her investigation through course-grained actions at first, and then proceeds to fine-tune those findings into a relevant final result set. Visualization and analysis tools in the platform may then be used to manually and automatically assess the results for relevance. The relevant records can be printed, exported, or submitted processing.

SSL traffic inspection and analysis is carried out in a known manner, as further depicted in FIG. 3. In this example environment, first and second instances of an SSL proxy are positioned in the enterprise network between endpoints (represented by "Client 1" and "Client 2") and the Internet 312 and the external server 314 (e.g., a web server, an application server, a database server, or the like) to which a client seeks to communicate. A representative SSL proxy (or other user proxy) is available commercially as Thunder, available from A10 Networks®. As depicted in FIG. 3, the SSL proxy is installed, typically as a network appliance, between the internal clients and the Internet (or cloud), and it operates as an SSL forward proxy. In operation, proxy instance 310a decrypts outbound SSL traffic and sends a copy of the unencrypted traffic to the packet capture appliances 302 for forensics analysis by the forensics module 304. The proxy instance 310b re-encrypts the request (typically an HTTP request) and forwards it to the server 314, which server responds by sending back an encrypted response. The proxy instance 310b intercept and decrypts the response, and it forwards a copy of the unencrypted traffic to the packet capture appliances 302 for forensics analysis, once again by the module 304. The proxy instance 310a then re-encrypts the server response and sends it back to the requesting client.

Incident forensics technologies as described and depicted may be used in association with other security services, such as those provided by a Security Information Event Management (SIEM) system. SIEM tools provide a range of services for analyzing, managing, monitoring, and reporting on IT security events and vulnerabilities. Such services typically include collection of events regarding monitored accesses and unexpected occurrences across the data network, and analyzing them in a correlative context to determine their contribution to profiled higher-order security events. They may also include analysis of firewall configurations, network topology and connection visualization tools for viewing current and potential network traffic patterns, correlation of asset vulnerabilities with network configuration and traffic to identify active attack paths and high-risk assets, and support of policy compliance monitoring of network traffic, topology and vulnerability exposures. For example, IBM® Security QRadar® SIEM is an enterprise solution that is operative to capture real-time Layer 4 network flow data from which Layer 7 application payloads may then be analyzed, e.g., using deep packet inspection and other technologies. It provides situational awareness and compliance support using a combination of flow-based network knowledge, security event correlation, and asset-based vulnerability assessment.

The above-mentioned commercial products are merely exemplary and are not intended to limit this disclosure.

Enhancing Endpoint Security to Facilitate Providing of Enriched Network Forensics With the above as background, the technique of this disclosure is now described.

Figure 4:
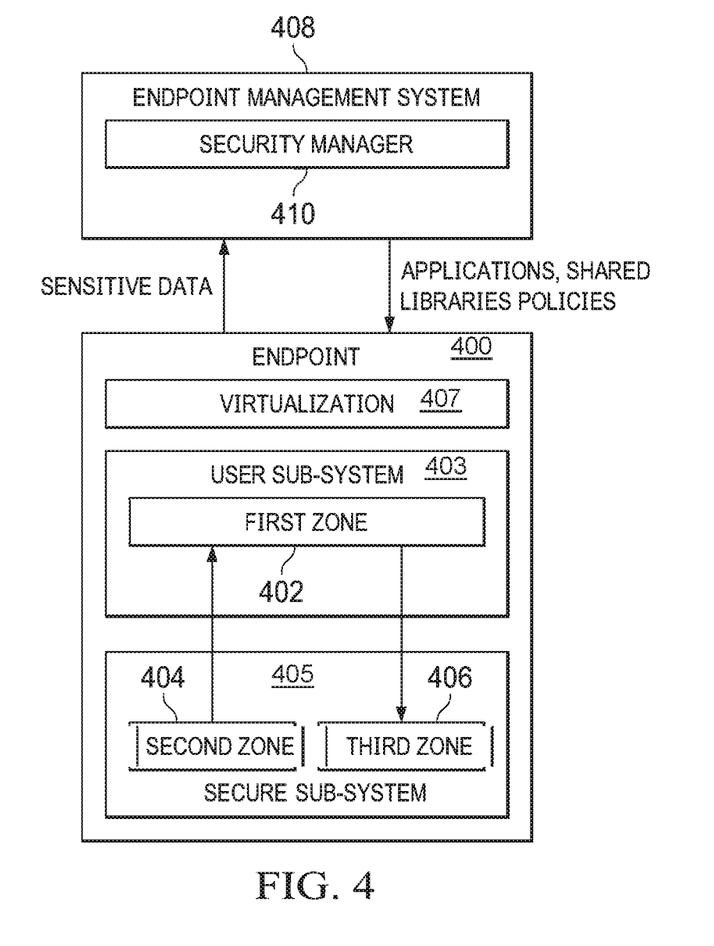
FIG. 4 depicts a security architecture of this disclosure.

As described generally above, the approach herein is to provide a technique to enhance the security of enterprise endpoint, while at the same time ensuring full useability of the endpoint by the user. As will be seen, this goal is achieved by instantiating in the endpoint memory "first," "second" and "third" security zones. The notion of "first," "second" and "third" as used herein is designed to identify and distinguish the various security zones for exemplary or descriptive purposes, and this nomenclature is not intended to associate some relevant importance to the zones. Typically, a "security zone" as used herein refers to a logical entity and its associated computational and memory elements, and for which different security requirements are capable of being imposed and enforced. As depicted in FIG. 4, in a preferred approach, the endpoint 400 has three (3) distinct security zones, namely, a first security zone 402, a second security zone 404, and a third security zone 406. The first security zone is sometimes referred to herein as a user space zone because this is the zone in which applications used by the user and permitted to be run are actually executed. The second security zone is sometimes referred to herein as a DMZ (demilitarized zone) because this zone acts as a logical and/or physical area that contains and exposes only certain information to the first security zone, which (with respect to the second or third zones) is untrusted. The third security zone is sometimes referred to herein as secure zone because its contents are completely secured from the end user. Preferably, the end user preferably is not aware of the existence of either the second or the third zones.

The security zones have differing security characteristics that are now described. In particular, and with respect to an authorized user, first security zone 402 is readable and writable, the second security zone 404 is read-only, and the third security zone 406 is neither readable nor writable. The first security zone 402 may be thought of as a user "subsystem" 403 for which the user in effect has root access and over which the user can exercise control. The second and third security zones 404 and 406 together comprise what may be considered to be a secure sub-system 405 that is not exposed to the user, and that is not reachable by the user directly. In one implementation, the first, second and third security zones are established using virtualization technology 407, and preferably under the direction and control of an endpoint management system 408 that otherwise manages the endpoint in the enterprise network. Such endpoint management systems are well-known. One such commercial system is IBM® BigFix®. In this example embodiment, the user sub-system 403 is instantiated by the endpoint manager as a virtual host that is fully managed by the end user. In operation, the virtual host preferably boots the user sub-system based on information obtained from the secure system.

Typically, each security zone is associated with physical components of the endpoint itself, although this is not necessarily a limitation as a particular security zone (or portion thereof) may reside externally to the endpoint itself.

Thus, and according to an aspect of this architecture, preferably system information (e.g., applications, libraries, endpoint policies, etc.) are deployed into the first security zone 402 directly from the secure sub-system (instead of from other network systems) and, in particular, the second security zone 404 thereof. As noted above, the user space zone 402 is readable and writable for local users, and the DMZ zone 404 from which the applications, libraries, policies etc. are loaded into the first zone is only readable for local users. As also noted, the secure zone 406 is not reachable by local users. Preferably, endpoint management system 408 includes a security manager 410 that deploys the system information into the secure system. As noted above, typically the information comprises one or more applications, one or more libraries, one or more enterprise or other policies for the endpoint systems, and so forth. Endpoints preferably communicate with the endpoint management system 408 (and its associated security manager) securely, e.g., over secure communications link(s).

Representative virtualization technology that may be used herein may be VMware available commercially from VMWare, Inc. In an example scenario, VMware creates two virtual machines (VMs) based on WMware ESXi. The first virtual machine is for the user (the user sub-system as has been described), and the second VM is for the security sub-system. The second virtual machine then creates two file systems, with the first being used for the DMZ (the second security zone), and the other being used for the secure zone (the third security zone). The DMZ is then shared with the user's virtual machine via Network File System (NFS) technology with read-only permission. The second virtual machine is fully-managed by the endpoint management system 408. In this way, the end user has no authority even for the VM that constitutes the user sub-system. Of course, other types of virtualization and file sharing technologies may be used.

An end user that is authenticated and authorized to use the endpoint system is a local user. Because the local user has root access to the first security zone, he or she can create his or her own system over which the user can exercise full control. This enables the end user to customize the endpoint system (e.g., to install software, customize the interface, etc.) all without compromising the security of the endpoint, which as noted above includes its own secure sub-system comprising the second and third zones that are hidden (not visible or accessible) to the end user. Unbeknownst to the end user, the user space sub-system communicates with the secure sub-system as necessary. As noted, the user sub-system always loads the applications, system libraries and the like, from the secure sub-system in lieu of other systems, devices or storage that do not comprise the secure sub-system. This guarantees that, when needed, the user sub-system always first attempts to find the applications or libraries from the secure sub-system. If the required applications or libraries are not found there, the user system may then search for that information locally.

While system information then is loaded from the second security zone to the first security zone in the manner just described, the approach herein provides information transfer in the opposite direction under certain circumstances that are now described. In particular, often it is the case that sensitive information is generated in association with applications and processes executing in the first security zone. A typical use case of this type occurs when an end user client such as a SSL/TLS client establishes a secure connection from the endpoint to some other server in the enterprise network or external to the network. As is well-known, a secure connection of this type involves a SSL/TLS handshake that involves receipt, generation and delivery of cryptographic information. Thus, for example, cryptographic protocols such as SSL/TLS are often based on public key cryptographic systems, such as the RSA (Rivest, Shamir and Adelman) encryption algorithm. For a traditional RSA-based SSL session, the two sides of a connection agree upon a "pre-master secret" (PMS) which is used to generate the parameters for the remainder of the session. Typically, the two sides use RSA asymmetric encryption to establish the pre-master secret without exchanging the actual value in plaintext. In operation, the SSL client generates the pre-master secret and encrypts it with the SSL server's publicly available RSA key. This generates an encrypted pre-master secret (ePMS), which is then provided to the SSL server. The SSL server has a private decryption key, which is then used to decrypt the encrypted pre-master secret. At this point, both the client and the server have the original pre-master secret and can use it to generate the symmetric key used for actual encrypted and secure data exchange. Of course, secure sessions using other cryptographic algorithms and ciphers (e.g., Diffie-Hellman, ECC, and the many others) involve similar exchanges of sensitive data. Further, once a connection is secured in this manner, other confidential, proprietary or otherwise sensitive information (e.g., PII) may be exchanged over the established connection.

According to this disclosure, when sensitive information is generated in association with the first security zone, some or all of that sensitive information is then moved immediately from the first security zone 402 and to the third security zone 406, from which it is then uploaded, for example, to the endpoint security manager 410 component. The third security zone, as noted above, is highly secure, as it is only accessible to permitted systems and processes that exclude applications, libraries and other programs that are executing in the first security zone to which the end user has access and control over. Once information is received in the third security zone, it is immune from information leak or other compromise (e.g., a malicious attack on the endpoint). Generalizing, once sensitive information is moved into the third security zone from the first security zone, that information in whole or in part becomes available to those systems, applications, programs and processes having a need to know that information. Because such information, however, can no longer pass directly from the first security zone to the external systems, the endpoint is secured against information leak or other attack.

Thus, by establishing and maintaining the security zones, and by carefully managing information flow in the two opposite directions within the zones as has been described, an appropriate balance of security and useability is enforced at the endpoint. The system information necessary to run the endpoint and enforce the security policies are loaded into the first security zone, whereas the sensitive information necessary (or useful) to secure the endpoint is moved into the third security zone at the first opportunity to do so. The nature and type of the sensitive information may be varied and, in general, thus may be any type of information that is generated, used or otherwise available to be collected in association with the user space. Once moved into the third security zone, typically the information that has been moved is deleted or expunged from the first security zone. The approach thus provides significant control for end users while still enabling the enterprise to enforce stringent security requirements for the endpoint systems.

As noted above, an endpoint system may be any type of computing system, such as a personal computer, notebook, laptop, tablet, mobile device, any network-accessible machine, and so forth. As noted, preferably authenticated and authorized end users of these endpoints have full permission to manage their user system. The secure areas of these machines (the second and third security zones that comprise the secure sub-system) are managed by a secure management system, such as an endpoint manager. The end user has no access rights right with respect thereto, as the secure sub-system executes silently and without the end user's awareness. The secure sub-system only shares the DMZ zone with the user sub-system as needed, for example upon system initialization or configuration. When the end user starts an application, the user sub-system always tries to checkout any libraries that are required by that application first from the DMZ zone. Thus, if there are malicious libraries present, those libraries cannot be used to hijack the operations. In this scenario, the enterprise can also produce its own custom libraries, which are then loaded (e.g., by the endpoint manager) into the secure sub-system, and only then from the second security zone into the first security zone. With read-only permission, neither local users nor malicious third parties are able to overwrite these libraries, e.g., to bypass policy enforcement, attack the endpoint, etc. A further advantage is that, for patch management, the endpoint security manager can synchronize as needed with a patch management system (not shown) to update patches to the endpoint automatically.

Figure 5:
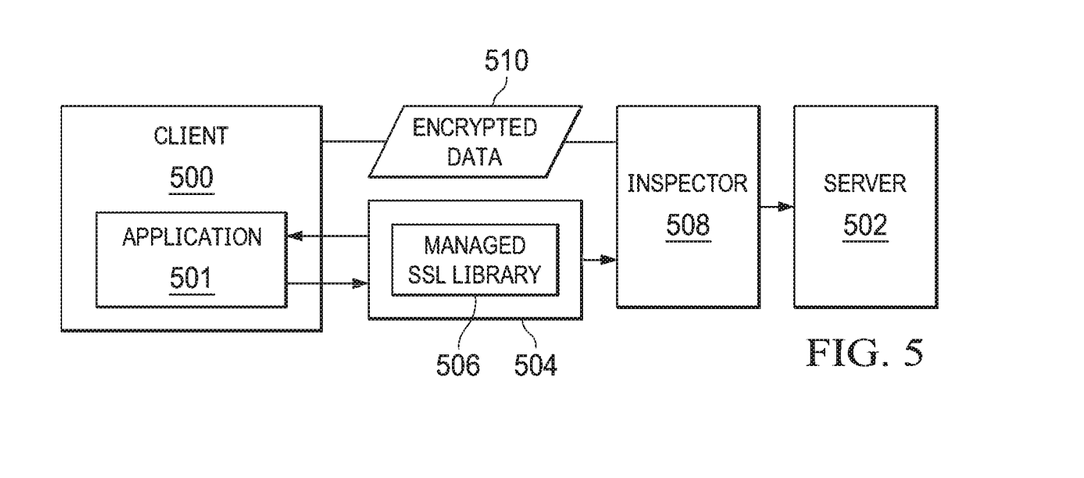
FIG. 5 depicts how the security architecture may be used to facilitate SSL inspection in association with a forensic analysis.

There is also is no limitation concerning what use the security manager 410 may put to the information obtained from the third security zone. An example use case is the forensic analysis of SSL traffic referenced above with respect to FIG. 3. As is known, a basic approach implemented is to obtain the master secret and generate a relationship between the master secret and the connection (e.g., the source IP address, destination IP address, source port, destination port, application name, timestamp, etc.). After associating the master secret and connection information, such information may be provided (to interested and authorized systems) to decrypt the captured connection. Thus, as depicted in FIG. 5, when client 500 through application 501 tries to establish an SSL communication with remote server 502, it initializes at step (1) to a manager 504 (e.g., a forensics management center), which hosts a managed SSL library 506. The managed SSL library 506 in this example scenario is a shared library that is deployed from the manager 504 and into the second security zone, as previously described. At step (2), the managed SSL library 506 generates a master secret and, at step (2), provides it back to the application 501 executing on the client 500. Manager 504 also sends a copy of the master secret to a network inspector 508. Because both the client 500 and the network inspector 508 now share the same master secret, encrypted data 510 sent from the client can be decrypted and checked by the network inspector. As noted above, any information generated or otherwise associated with the first security zone (e.g., including, without limitation, the encrypted data 510, other key data used to facilitate the generation of the master secret, etc.) is moved into the third security zone prior to being transferred from the client.

While the usual implementation includes all three security zones, there may be scenarios where the second and third zones may be combined into just one secure zone, or where the first and second zones may be combined into one user zone, etc. Further, while "zoning" is the preferred approach, other protection schemes (e.g., protected storage or memory) may be utilized to create and maintain the protected areas (whether on-disk, in-memory, or otherwise) as described.

The technique of this disclosure provides significant advantages, as have been described. As noted, the approach dedicates a read-only area in which system information (e.g., applications, shared libraries, enforcement policies, and so forth) is placed by an endpoint management system. The physical portion of this area may be a directory, a partition, or some other dedicated storage or memory region. With the approach, the local system is forced to first attempt to find the system information (e.g., the shared libraries) from this area irrespective of the application environment or configuration. The read-only access guarantees that the local user (or any malware) cannot bypass the enforcement rules. As necessary, the shared libraries (e.g., those that create or receive cryptographic information such as a master secret) writes sensitive information into the third security zone, namely, the area to which the local system has no access. This security architecture thus prevents the secrets from being stolen. The endpoint central management system, however, has access to this secure sub-system, which at most has a portion that is read-only from local user point of view, while the remainder thereof is completely inaccessible by the local user. The endpoint manager also can force deployment of update or patch (e.g., any vulnerability update) to this secure area.

The approach of this disclosure guarantees that the secure zone cannot be corrupted by local users or by malware. From the end user's point of view, the endpoint appears to be managed locally. When the user boots the computer, the underlying virtualization technology being managed by the endpoint manager exposes (to the end user) a virtual host, which the end user manages. The virtual host boots the system based from the secure sub-system zone to load the boot image as well as the secure libraries. The endpoint manager preferably manages the virtualization technology as well as the secure zone, as has been described. This enables the secure manager to deploy or update any system or secure libraries automatically to the endpoint.

The solution herein provides an environment that end users have the root access to their own working environment in the endpoint system. It also guarantees that enterprise rules/policies that are deployed in the endpoint system cannot be overwritten by end users due to the root privilege. With the zoning technique as described, the third security zone can store the sensitive information that the enterprise needs to collect from its employees, and then upload that information to other systems.

The approach provides a robust mechanism by which an enterprise can ensure that endpoints only use the enterprise-provided libraries and software. The security zone approach protects restricted or security-sensitive files of local system from being tempered with either by malware or by an undisciplined user. The resulting endpoint is more secure and robust to malware, which cannot access sensitive data or otherwise tamper with important system files. In this preferred embodiment, privileged data, library or other system commands reside in the secure sub-system deployed by the endpoint security manager. By forcing the user space zone to load from the secure zone, the user system on the endpoint is used only in a managed way. In this manner, individual user processes running in the user space do not have to be granted specific privileges before executing.

While the techniques have been described in the context of an endpoint machine in an enterprise networking environment, this is not necessarily a limitation. Generalizing, the security zone establishment and processing described herein may be carried in any machine configured as a physical device, a virtual device, or some combination thereof. It can be used for a number of different applications.

As has been described, the functionality described above may be implemented as a standalone approach, e.g., a software-based function executed by a processor, or it may be available as a service (including as a web service via a SOAP/XML interface). The particular hardware and software implementation details described herein are merely for illustrative purposes are not meant to limit the scope of the described subject matter.

More generally, computing devices within the context of the disclosed subject matter are each a data processing system (such as shown in FIG. 2) comprising hardware and software, and these entities communicate with one another over a network, such as the Internet, an intranet, an extranet, a private network, or any other communications medium or link. The applications on the data processing system provide native support for Web and other known services and protocols including, without limitation, support for HTTP, FTP, SMTP, SOAP, XML, WSDL, UDDI, and WSFL, among others. Information regarding SOAP, WSDL, UDDI and WSFL is available from the World Wide Web Consortium (W3C), which is responsible for developing and maintaining these standards; further information regarding HTTP, FTP, SMTP and XML is available from Internet Engineering Task Force (IETF). Familiarity with these known standards and protocols is presumed.

The techniques described herein may be implemented in or in conjunction with various client-side architectures (e.g., firewalls, NAT devices), and in or in conjunction with various server-side architectures including simple n-tier architectures, web portals, federated systems, and the like. The techniques herein may be practiced in a loosely-coupled server (including a "cloud"-based) environment.

Still more generally, the subject matter described herein can take the form of an entirely hardware embodiment, an entirely software embodiment or an embodiment containing both hardware and software elements. In a preferred embodiment, the trusted platform module function is implemented in software, which includes but is not limited to firmware, resident software, microcode, and the like. Furthermore, the download and delete interfaces and functionality can take the form of a computer program product accessible from a computer-usable or computer-readable medium providing program code for use by or in connection with a computer or any instruction execution system. For the purposes of this description, a computer-usable or computer readable medium can be any apparatus that can contain or store the program for use by or in connection with the instruction execution system, apparatus, or device. The medium can be an electronic, magnetic, optical, electromagnetic, infrared, or a semiconductor system (or apparatus or device). Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD. The computer-readable medium is a tangible, non-transitory item.

The computer program product may be a product having program instructions (or program code) to implement one or more of the described functions. Those instructions or code may be stored in a non-transitory computer readable storage medium in a data processing system after being downloaded over a network from a remote data processing system. Or, those instructions or code may be stored in a computer readable storage medium in a server data processing system and adapted to be downloaded over a network to a remote data processing system for use in a computer readable storage medium within the remote system.

In a representative embodiment, the interfaces and utility are implemented in a special purpose computing platform, preferably in software executed by one or more processors. The software is maintained in one or more data stores or memories associated with the one or more processors, and the software may be implemented as one or more computer programs. Collectively, this special-purpose hardware and software comprises the functionality described above.

While the above describes a particular order of operations performed by certain embodiments of the invention, it should be understood that such order is exemplary, as alternative embodiments may perform the operations in a different order, combine certain operations, overlap certain operations, or the like. References in the specification to a given embodiment indicate that the embodiment described may include a particular feature, structure, or characteristic, but every embodiment may not necessarily include the particular feature, structure, or characteristic.

Finally, while given components of the system have been described separately, one of ordinary skill will appreciate that some of the functions may be combined or shared in given instructions, program sequences, code portions, and the like.

As noted, the endpoint is not limited to any particular type. The above-described operation may likewise be used in association with any known technique or mechanism that itself is used to intercept, decrypt, inspect, modify, rewrite and re-encrypt data from any machine, irrespective of the machine's physical configuration.

The techniques herein generally provide for the above-described improvements to a technology or technical field, as well as the specific technological improvements to network-connected machines, such as described above.

Having described our invention, what we claim is as follows:

1. A method to secure an endpoint in a computer network, comprising:

instantiating first, second and third security zones in the endpoint, wherein, with respect to a user of the endpoint, the first security zone is readable and writable, the second security zone is read-only, and the third security zone is neither readable nor writable;

deploying first information into the second security zone;

upon a given occurrence, loading the first information from the second security zone into the first security zone to enable the endpoint to use the first information; and upon generating second information in the first security zone, the second information including sensitive data, transferring the second information from the first security zone to the third security zone to protect the sensitive data from information leak or compromise.

2. The method as described in claim 1 further including securely transferring the second information to a remote server from the third security zone.

3. The method as described in claim 2 wherein the second information is a cryptographic key used to secure communications initiated at the endpoint and intended for the remote server.

4. The method as described in claim 1 wherein the first information is one of: an application configured to execute in the endpoint, a library configured to execute in association with the application, and a policy that is configured to be enforced on the endpoint.

5. The method as described in claim 4 wherein the given occurrence is one of: initialization of the endpoint, starting of the application, performing a library checking operation, and an operation associated with enforcing the policy.

6. The method as described in claim 1 wherein the first, second and third zones are instantiated in a virtual host process.

7. The method as described in claim 1 wherein the first, second and third zones are instantiated by an endpoint management system that manages the endpoint.

\* \* \* \* \*